(No Model.)

C. SILL.
RAIL.

No. 532,293. Patented Jan. 8, 1895.

WITNESSES:
Chas. Niola
Theo. G. Hoster

INVENTOR
C. Sill
BY
Munn & Co
ATTORNEYS.

UNITED STATES PATENT OFFICE.

CHARLES SILL, OF NEW YORK, N. Y.

RAIL.

SPECIFICATION forming part of Letters Patent No. 532,293, dated January 8, 1895.

Application filed November 3, 1894. Serial No. 527,817. (No model.)

*To all whom it may concern:*

Be it known that I, CHARLES SILL, of New York city, in the county and State of New York, have invented a new and Improved Rail, of which the following is a full, clear, and exact description.

The object of the invention is to provide a new and improved rail designed for use on electric railways, and arranged for the cars to travel on in the usual manner, and to form in addition thereto a housing for the electric conductor and trolley wire.

The invention consists of a rail made in sections and formed with a longitudinal duct for the conducting cable or cables, and from which duct lead apertures to a recess in the rail carrying the trolley wire.

The invention also consists of certain parts and details and combinations of the same, as will be hereinafter fully described and then pointed out in the claims.

Reference is to be had to the accompanying drawings, forming a part of this specification, in which similar letters of reference indicate corresponding parts in all the views.

Figure 1:
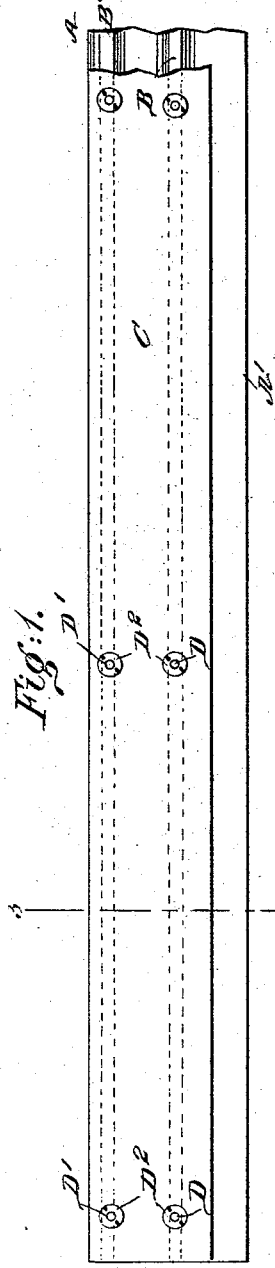
Figure 2:
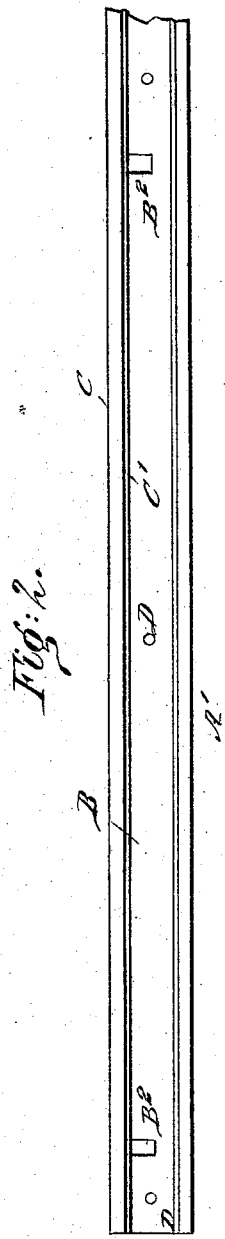

Figure 1 is a plan view of the improvement. Fig. 2 is an inner side elevation of the same; and Fig. 3 is an enlarged transverse section of the same on the line 3—3 of Fig. 1.

The improved rail is provided with a base A, from which extend upwardly the webs B, B', arranged parallel one to the other and supporting a top plate C, forming a cover for the space between the webs B, B', so as to produce a duct for receiving the cable or cables which conduct the electricity to the trolley wire. This top plate C is fastened in place by bolts D, D', held with their lower ends in the webs B, B', as illustrated in the drawings, the nuts $D^2$ of the said bolts being countersunk in the top plate C, so as to prevent any projection whatever on the top surface thereof.

Figure 3:
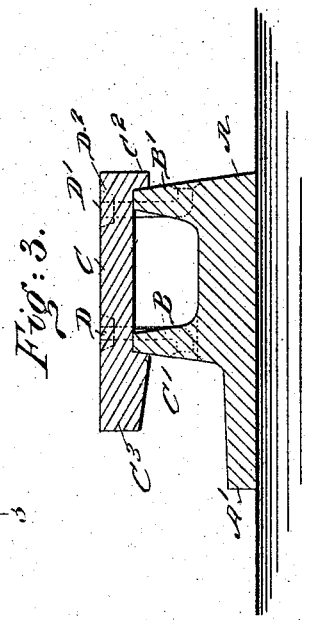

In order to prevent the top plate C from shifting laterally, I provide the same on the under side with lugs C' and $C^2$, engaging the webs B, B" at their outer faces, as plainly shown in Fig. 3. The top plate C is formed with an inward projection or head $C^3$, on which the wheel of a car is adapted to travel, and the base A is likewise extended at A' on the inside, so as to form with the web B and the head $C^3$, a recess for the reception of a trolley wire connected by short arms with the cable or cables contained in the duct, the connection being made through apertures or recesses $B^2$ formed at stated intervals in the web B.

Now, it will be seen that by the arrangement described a rail of considerable strength is obtained for all street railway and other railway purposes. At the same time a duct is provided for the reception of the conducting cable or cables, and at the same time provision is made for the reception of the trolley wire connected by branches with the cables and adapted to be engaged by the trolley wheel to transmit the electricity to the motor in the car.

Having thus fully described my invention, I claim as new and desire to secure by Letters Patent—

1. A rail made in sections and formed with a longitudinal duct for the reception of the conducting cables, the said rail being also formed with a recess adapted to receive a trolley wire and connected by apertures with the said duct, substantially as shown and described.

2. A sectional rail having a longitudinal duct to receive and house the main conductor and having its sections spaced apart at one edge to form a longitudinal open recess adapted to receive a trolley wire, said rail being also provided with apertures affording communication between said duct and recess, substantially as set forth.

CHARLES SILL.

Witnesses:
THEO. G. HOSTER,
C. SEDGWICK.